UNITED STATES PATENT OFFICE.

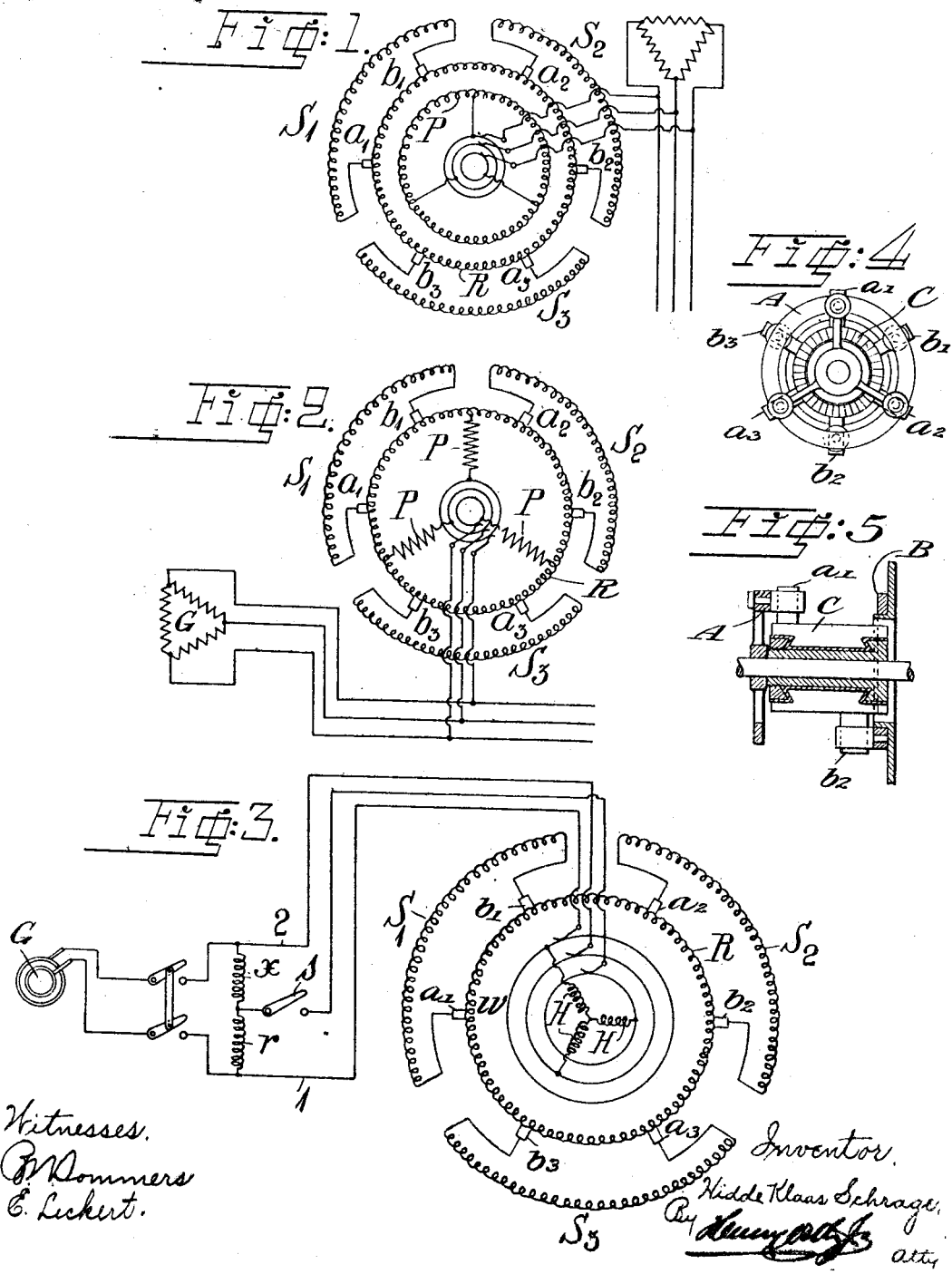

HIDDE KLAAS SCHRAGE, OF VESTERÅS, SWEDEN, ASSIGNOR TO ALLMÄNNA SVENSKA ELEKTRISKA AKTIEBOLAGET, OF VESTERÅS, SWEDEN.

COMMUTATOR-MOTOR.

1,079,994.  Specification of Letters Patent.  Patented Dec. 2, 1913.

Application filed September 9, 1911. Serial No. 648,453.

*To all whom it may concern:*

Be it known that I, HIDDE KLAAS SCHRAGE, a citizen of the Kingdom of the Netherlands, residing at Vesterås, Sweden, have invented new and useful Improvements in Commutator-Motors, of which the following is a specification.

As is well known, it is possible to regulate the speed of polyphase commutator motors by varying the voltage of the current supplied to the rotor. To do this there is required either an induction controller or a transformer having a plurality of spaced leads or a controlling winding on the stator having a plurality of spaced leads and in the two last mentioned cases moreover a controller for accomplishing the regulation. Further some kind of special device is required for obtaining a good power factor, and in motors having a regulating winding on the stator there has been used for this purpose for instance a small magnetizing transformer. Without this transformer the power factor would be very unfavorable, due to the fact that the current of the secondary circuit has the same frequency as that of the supply circuit. All of the said auxiliary apparatus render the device very complicated and expensive.

The present invention relates to a commutator motor of the induction motor type, in which a regulation of the speed can be effected in a simple manner by brush displacing and which has a good power factor, no auxiliary devices being necessary to attain the latter result.

The invention is, chiefly, characterized in that each phase of a polyphase secondary winding is for itself shortcircuited by means of brushes through a variable portion of a closed continuous current winding with commutator.

In the accompanying drawing I have in Figures 1–3 shown diagrammatically three embodiments of my invention. Fig. 4 is an end view and Fig. 5 a longitudinal section of the commutator of the motors shown in Figs. 1, 2 and 3.

Referring to Fig. 1, P indicates a three-phase winding on the rotor, which by means of slip rings and sliding brushes can be connected to a three phase generator G. R indicates a regulating winding constructed as a closed continuous current winding which is likewise disposed on the rotor and is provided with a commutator C (Figs. 4 and 5). To said commutator belong three pairs of brushes $a_1$—$b_1$, $a_2$—$b_2$ and $a_3$—$b_3$. The brushes $a_1$, $a_2$, $a_3$ are suitably provided on one common rocker ring A and the brushes $b_1$, $b_2$, $b_3$ on a second rocker ring B, said rings being turnable independently of each other.

$S_1$, $S_2$, $S_3$ indicate the three phases of a three phase secondary winding disposed on the stator, each of said windings being connected to one of the brush pairs $a_1$—$b_1$, $a_2$—$b_2$ and $a_3$—$b_3$ respectively and thereby shortcircuited through the portions of the regulating winding lying between the two brushes of each pair. The primary member of the motor thus comprises the winding P, while the secondary member consists of the windings $S_1$, $S_2$ and $S_3$ which are connected in series with portions of the regulating winding.

The motor now described works as follows. Assuming that three phase alternating current is supplied to the primary winding P from the generator G and that the commutator brushes of the regulating winding are so adjusted that the angle between the brushes $a_1$—$b_1$, $a_2$—$b_2$ and $a_3$—$b_3$ is null, so that thus the stator windings $S_1$, $S_2$, $S_3$ are directly shortcircuited, the motor will run substantially synchronously and works as a usual induction motor, i. e. the frequency of the secondary circuits is proportional to the slip of the rotor. If the two rocker rings A and B be turned relative to each other so that varying portions of the regulating winding R are connected in series with each of the stator windings, a regulation of the speed is obtained, that can be calculated in the following manner. If $c$ is the frequency of the generator G and $p$ the half number of poles of the motor, the field rotates relative to the rotor at a speed $$n = \frac{60c}{p}$$

revolutions a minute. If the number of revolutions of the rotor per minute is indicated by $n_r$ and the real revolutions of the fields per minute is indicated by $n_f$, so is always $$n_r = n \pm n_f.$$

The field induces between the brushes $a_1$—$b_1$ (and similarly for the brushes $a_2$—$b_2$ and $a_3$—$b_3$) a voltage of a frequency of $$c_f = \frac{pn_f}{60}$$

and in the stator a voltage of the same frequency. The voltage between $a_1$ and $b_1$ is:

$$e_r = \text{const.} \times cw_r\phi,$$

where $\phi$ is the strength of the field and $w_r$ the number of turns of the portion of the regulating winding inclosed between the brushes. The voltage in each stator phase is:

$$e_s = \text{const.} \times c_f w_s \phi$$

where $\phi$ indicates the same as before and $w_s$ is the number of turns of each stator phase. The rotor tends to assume a speed at which the voltages $e_r$ and $e_s$ are equal to each other; consequently is:

$$c_f w_s = cw_r \text{ or } c_f = c\frac{w_r}{w_s}.$$

The field rotates at a speed $$n_f = \frac{60c_f}{p}$$

and as above mentioned relative to the rotor at a speed $$n = \frac{60c}{p}.$$

One obtains thus:

$$n_r = \frac{60}{p}(c \pm c_f) = \frac{60c}{p} \cdot \frac{w_s \pm w_r}{w_s}.$$

It is evident from this expression that it is possible to regulate the speed of the motor to over- or under-synchronous speed by varying $w_r$, i. e. that portion of the regulating winding lying between the brushes.

It should be observed that the voltages $e_r$ and $e_s$ can nullify each other only if the secondary winding and the portion of the regulating winding incidentally used have the same axes so that said voltages are in phase with each other. It may, however, be suitable to displace the axes of said windings in relation to each other, by displacing the brushes $a_1$ $b_1$, $a_2$ $b_2$ and $a_3$ $b_3$ somewhat in the same direction whereby the voltages $e_r$ and $e_s$ will give a resultant by means of which the phase displacement of the motor can be compensated. The speeds calculated will hereby be influenced only to a small degree.

Fig. 2 shows a constructional form in which the regulating winding R and the main winding P of the rotor are connected to each other so that the main current flows also through the regulating winding. The arrangement and working are otherwise the same as those described with reference to Fig. 1.

The regulating winding and the commutator according to the present invention need be dimensioned only for a part of the normal load of the motor depending on the limits of regulation. If it is desired to regulate the motor from 50% under-synchronous to 50% over-synchronous speed, the regulating winding and the commutator are dimensioned only for 50% of the load of the motor. The voltage between the commutator segments may therefore be kept low without the brush surface becoming too large, on account whereof the commutation does not meet any special difficulties.

The main winding of the motor may also be carried out as a single phase-winding, so that the motor is supplied with single phase current while the secondary circuit is of three phase type. In such case a special starting phase must be arranged in the rotor, and the motor is started as a usual single phase induction motor.

Fig. 3 shows a single phase motor embodying the invention. W indicates the working phase of the rotor and H the starting phase thereof. $r$ is an ohmic resistance and $x$ an inductive resistance which are connected in series to each other between the supply wires 1, 2 and serve in well known manner to create a current which is out of phase with the main current and is supplied to the starting phase H of the rotor. The regulating winding R and the stator windings $S_1$, $S_2$, and $S_3$ are arranged in the same manner as in the three phase motor shown in Fig. 1.

During the starting operation the three stator phases may be shortcircuited directly through the brushes, $a_1$ $b_1$, $a_2$ $b_2$ and $a_3$ $b_3$. After the starting the starting phase is disconnected by means of the circuit breaker $s$. If the single phase motor shown in Fig. 3 is regulated by turning the two rocker rings carrying the brushes in the same manner as in the three phase motor shown in Fig. 1, the field maintains its character as rotating field of constant strength, and the speed regulation takes place in accordance with the same law as in the three phase motor.

One may, if desired, arrange the primary winding and the regulating winding in the stator and the secondary winding in the rotor. In such case it is, however, necessary to arrange the brushes rotating, which renders the arrangement complicated.

Though I have shown single and three phase motors in the drawing it is obvious that my invention is not limited to any certain number of phases.

Having now described my invention what I claim as new and desire to secure by Letter Patent is:

1. In a dynamo electric machine, a rotor having a primary winding, and a regulating winding, means for supplying current to said primary winding, a commutator connected to said regulating winding, brushes for said commutator and a stator carrying a polyphase winding each phase of which is connected independently of the other phases to a pair of said brushes bearing on said commutator, substantially as and for the purpose set forth.

2. In a dynamo electric machine, a rotor having a primary winding and a regulating winding connected to said primary winding and forming a part of the primary circuit, means for supplying current to said primary winding, a commutator connected to said regulating winding, brushes for said commutator, and a stator carrying a polyphase winding each phase of which is connected independently of the other phases to a pair of said brushes bearing on said commutator, substantially as and for the purpose set forth.

3. A dynamo electric machine comprising a rotor having a primary winding and a closed continuous current winding, slip rings connected to said primary winding, a commutator connected to said continuous current winding, adjustable brushes for said commutator, and a stator carrying a polyphase winding each phase of which is connected independently of the other phases to a pair of said adjustable brushes bearing on said commutator, substantially as and for the purpose set forth.

4. A dynamo electric machine comprising a rotor having a primary winding and a closed continuous current winding, slip rings connected to said primary winding, a commutator connected to said continuous current winding, two rocker rings carrying a number of brushes bearing on said commutator, and a stator carrying a polyphase winding, each phase of which is connected independently of the other phases to one brush on each of said rocker rings, substantially as and for the purpose set forth.

5. In a dynamo electric machine, a rotor having a primary winding and a regulating winding, means for supplying current to said primary winding, a stator having a non-interlinked polyphase winding, and means for connecting each phase of said polyphase winding with adjustable portions of said regulating winding.

In testimony whereof I have signed my name to this specification in the presence of two subscribing witnesses.

HIDDE KLAAS SCHRAGE.

Witnesses:
A. ROOT,
M. BAKER.